US008459681B2

(12) United States Patent
Chamberlain

(10) Patent No.: US 8,459,681 B2
(45) Date of Patent: Jun. 11, 2013

(54) BICYCLE CABLE HOUSING GUIDE

(75) Inventor: Jason L. Chamberlain, Morgan Hill, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 546 days.

(21) Appl. No.: 12/757,523

(22) Filed: Apr. 9, 2010

(65) Prior Publication Data
US 2011/0248468 A1    Oct. 13, 2011

(51) Int. Cl.
*B62J 11/00* (2006.01)
*F16C 1/10* (2006.01)

(52) U.S. Cl.
CPC ... *B62J 11/00* (2013.01); *F16C 1/10* (2013.01)
USPC .......................................... 280/288.4; 248/65

(58) Field of Classification Search
USPC .............. 280/288.4; 74/502.4, 502.6; 248/67, 248/67.5, 67.7, 74.1, 74.4
See application file for complete search history.

(56) References Cited

U.S. PATENT DOCUMENTS

| | | | |
|---|---|---|---|
| 2,417,269 A | 3/1947 | Robertson | |
| 2,616,646 A * | 11/1952 | Matthysse | 248/65 |
| 3,893,647 A | 7/1975 | Kennedy | |
| 4,039,744 A * | 8/1977 | Seaquist | 174/169 |
| 4,546,949 A * | 10/1985 | Millett et al. | 248/514 |
| 4,673,151 A * | 6/1987 | Pelz | 248/74.1 |
| 4,678,147 A | 7/1987 | Barnes et al. | |
| 4,733,835 A | 3/1988 | Schlanger et al. | |
| 4,805,479 A * | 2/1989 | Brightwell | 74/502.4 |
| 5,263,671 A | 11/1993 | Baum | |
| 5,568,905 A | 10/1996 | Smith, II | |
| 5,803,654 A | 9/1998 | Spease et al. | |
| 6,105,216 A * | 8/2000 | Opperthauser | 24/459 |
| 6,330,989 B1 | 12/2001 | Okamoto | |
| 6,354,545 B1 | 3/2002 | Liao | |
| 6,725,978 B2 * | 4/2004 | Karpowich | 188/20 |
| 7,478,707 B2 * | 1/2009 | Choon Chye et al. | 188/26 |
| 2006/0254381 A1 * | 11/2006 | Chamberlain | 74/502.4 |
| 2009/0140106 A1 * | 6/2009 | Johnson et al. | 248/55 |
| 2010/0051394 A1 * | 3/2010 | Tsai | 188/72.5 |
| 2010/0116598 A1 * | 5/2010 | Watarai | 188/24.22 |

* cited by examiner

*Primary Examiner* — J. Allen Shriver, II
*Assistant Examiner* — Wesley Potter
(74) *Attorney, Agent, or Firm* — Michael Best & Friedrich LLP

(57) ABSTRACT

A bicycle having a frame, two wheels, handlebars, a longitudinal housing (e.g., cable housing or hydraulic hose) defining radial and axial directions, and a housing guide securing the housing to the frame. The housing guide includes a base member and a clamp member. The base member has a base surface secured to the frame and defining a passage in which the housing is positioned, and the clamp member cooperates with the base member to secure the housing in both radial and axial directions. Preferably, the base member comprises first and second guide arms (e.g., opposed hooks) spaced by a gap and wrapped around the housing, and the clamp member is positioned in the gap. The clamp member can include a collar and a fastener that tightens the collar onto the housing. The collar can include an opening and a slot that facilitates inserting the housing into the opening.

14 Claims, 5 Drawing Sheets

BICYCLE CABLE HOUSING GUIDE

BACKGROUND

The present invention relates to bicycles, and particularly to guides for positioning cable housing on a bicycle frame.

Many bicycles have devices that are actuated by a cable, such as brakes and shifters. One end of a cable is secured to the device, and the other end of the cable is secured to a lever (e.g., a brake lever or shift lever). Movement of the lever results in movement of the device. In order to route the cable from the lever to the device, it is known to use cable housing through which the cable can slide for low-friction movement of the cable.

Some bicycles have devices that are actuated by hydraulic pressure, such as hydraulic brakes. Pressure is provided to these devices by a hydraulic piston actuated by a lever. Hydraulic fluid is routed from the piston to the device by hydraulic housing, commonly in the form of a fluid-tight hose.

Both cable-actuated devices and hydraulically-actuated devices require the routing of the corresponding housing between the lever and the device. In this regard, the bicycle frame commonly includes housing guides that hold the housing in place. Housing guides typically define a cylindrical passage through which the housing can be fed when installing the housing on the frame.

SUMMARY

The present invention relates to a bicycle having an improved housing guide. The bicycle includes a frame, two wheels, handlebars, and a longitudinal housing defining axial and radial directions. The housing guide secures the housing to the frame and includes a base member and a clamp member. The base member has a base surface secured to the frame and defining a passage in which the housing is positioned, and the clamp member cooperates with the base member to secure the housing in both radial and axial directions. In one embodiment, the longitudinal housing is a cable housing that guides a cable between a cable lever and a cable-actuated device (e.g., a brake or derailleur). In another embodiment, the longitudinal housing is a hydraulic hose that guides hydraulic fluid between a hydraulic lever and a hydraulically-actuated device (e.g., a hydraulic brake).

Preferably, the base member comprises first and second guide arms (e.g., opposed hooks) spaced by a gap (e.g., V-shaped) and wrapped around the housing, and the clamp member (e.g., V-shaped) is positioned in the gap between the guide arms. In addition, the clamp member can include a collar and a fastener (e.g., a bolt) that tightens the collar onto the housing. The collar can include an opening and a slot that facilitates inserting the housing into the opening.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
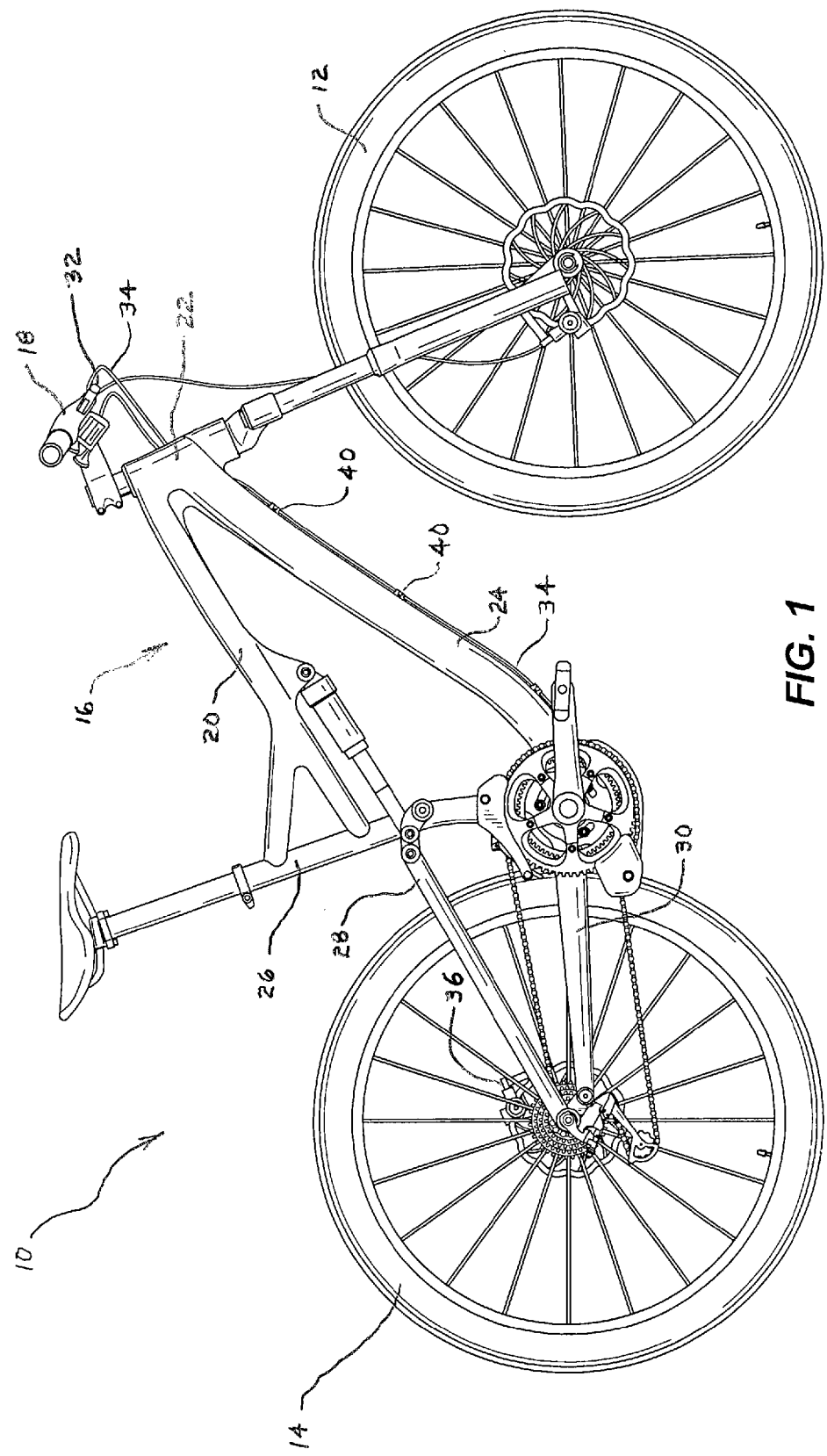
FIG. 1 illustrates a side view of a bicycle having a housing guide embodying the present invention.
Figure 2:
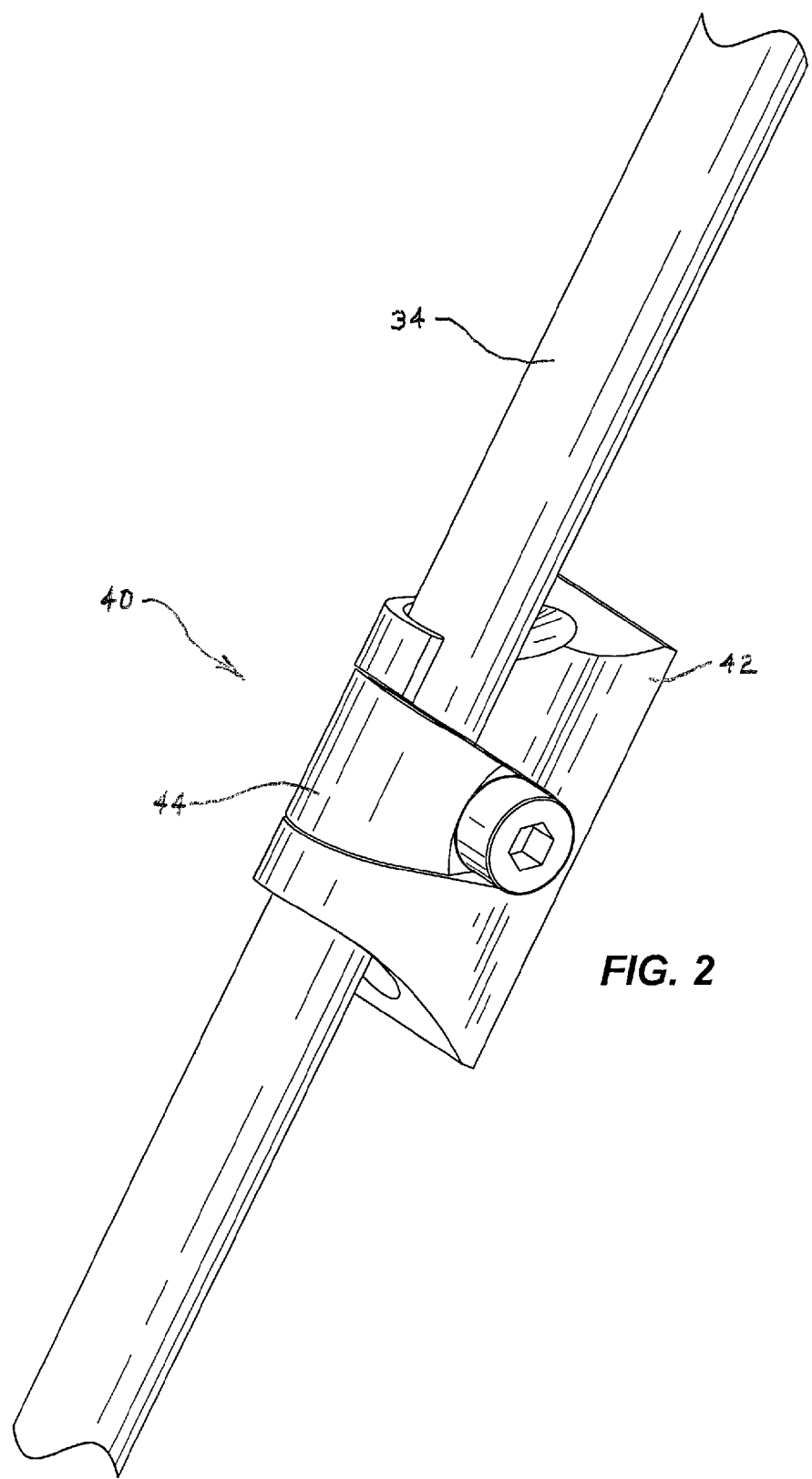
FIG. 2 is an enlarged perspective view of the housing guide and housing of the bicycle of FIG. 1.
Figure 3:
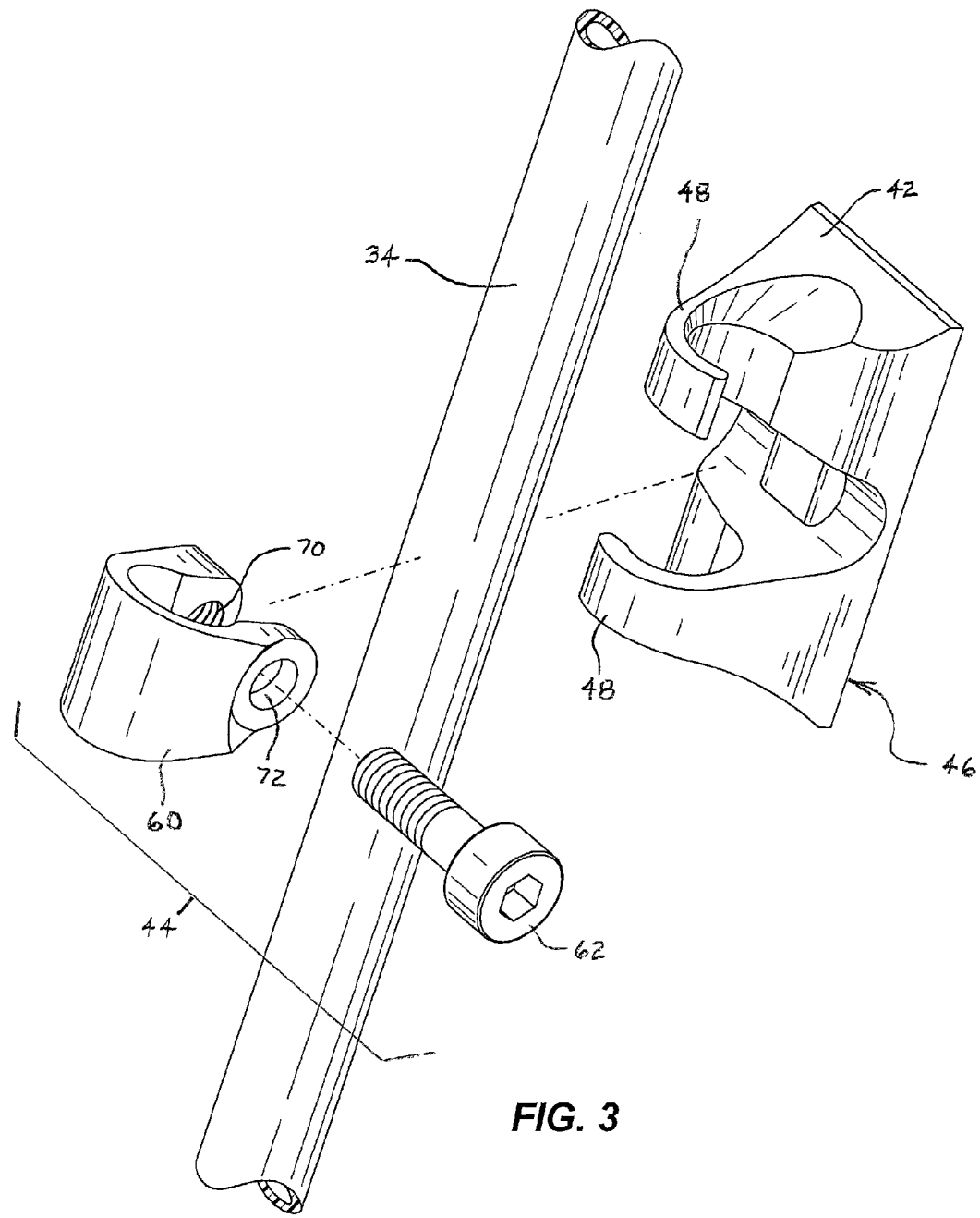
FIG. 3 is an exploded view of the housing guide and housing of FIG. 2.
Figure 4:
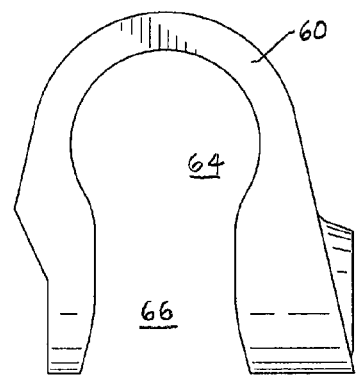
FIG. 4 is an end view of a clamp member.
Figure 5:
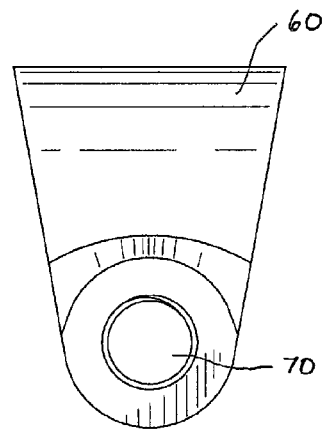
FIG. 5 is a side view of the clamp member of FIG. 4.
Figure 6:
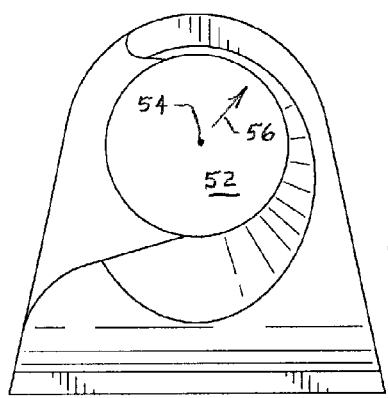
FIG. 6 is an end view of a base member.
Figure 7:
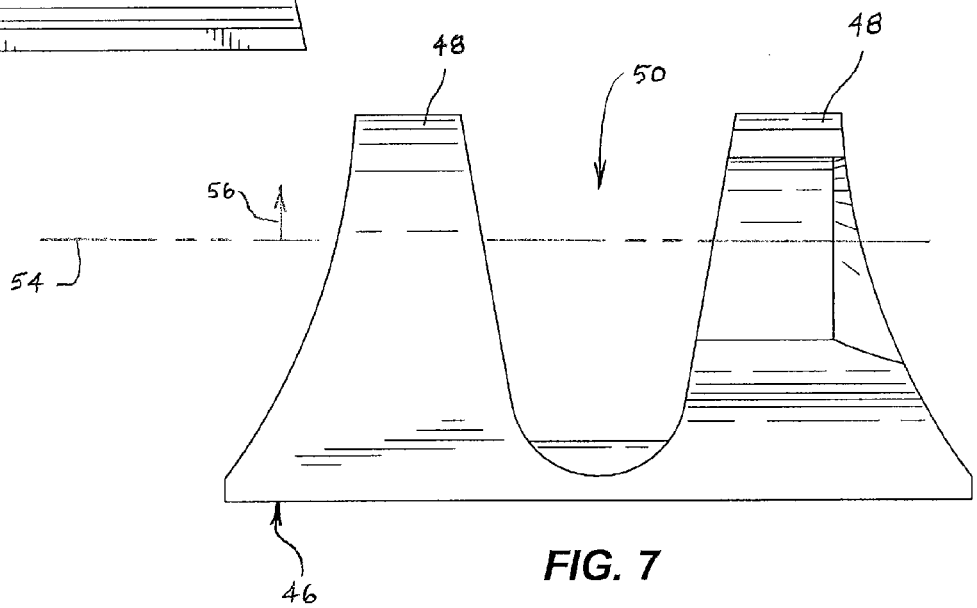
FIG. 7 is a side view of the base member of FIG. 6.

FIG. 1 illustrates a bicycle 10 that includes a front wheel 12, a rear wheel 14, a frame 16, and handlebars 18. The frame 16 includes a top tube 20, a head tube 22, a down tube 24, a seat tube 26, seatstays 28, and chainstays 30. The bicycle further includes a brake lever 32 secured to the handlebars 18, and a brake cable housing 34 secured to the down tube 24 and guiding a rear brake cable between the brake lever 32 and a rear brake 36. It should be understood that the cable housing 34 could instead be a hydraulic housing that guides hydraulic fluid between the brake lever and the rear brake.

The brake cable housing 34 is secured to the down tube 24 by a series of housing guides 40. Each of the housing guides 40 is secured to both the down tube 24 and the cable housing 34 to secure the cable housing 34 relative to the down tube 24 in both axial and radial directions. Each housing guide 40 includes a base member 42 and a clamp member 44.

Figure 8:
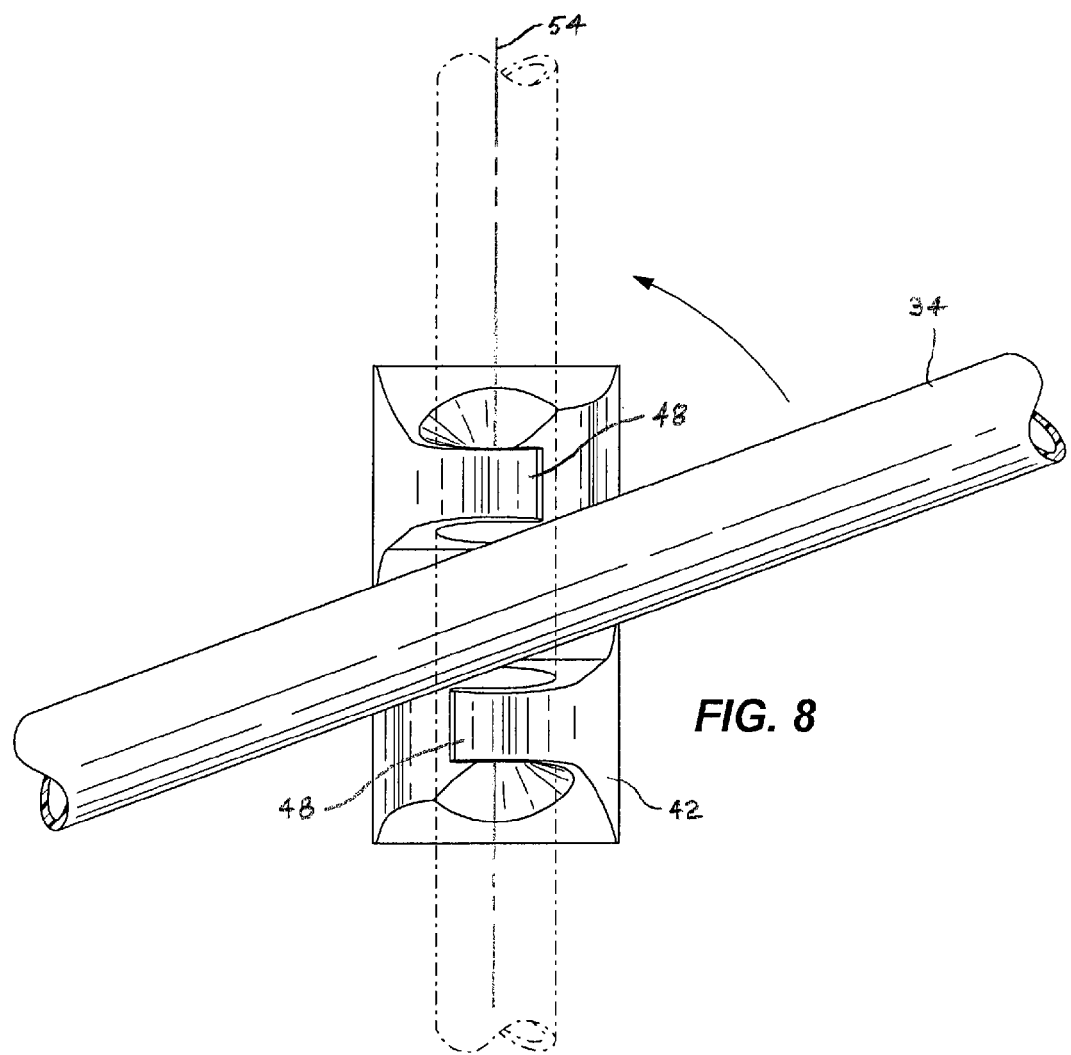
FIG. 8 is a top view of the base member of FIG. 7, with a housing being inserted into the base member.
Figure 9:
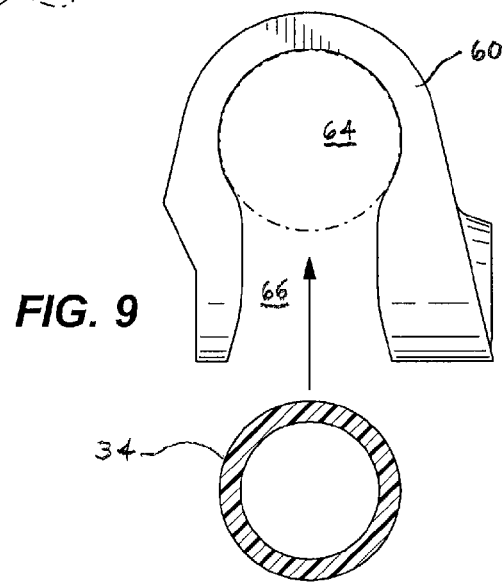
FIG. 9 is the end view of FIG. 4, with the housing being inserted into the clamp member.

The base member 42 includes a base surface 46 that is secured to the down tube 24, such as by welding, braising, bonding, riveting, strapping, or other appropriate means. The illustrated base member 42 further includes two guide arms 48 spaced apart from each other and defining a v-shaped gap 50. Each of the illustrated guide arms 48 is in the shape of a hook that wraps partially around the cable housing 34. The hook-shaped guide arms 48 face is opposition directions from each other. The guide arms 48 cooperatively define a cylindrical passage 52 defining a longitudinal axis 54 and radial directions 56 perpendicular to the axis 54. The cylindrical passage 52 is sized to receive the cable housing 34. Referring to FIG. 8, the housing 34 is inserted into the passage 52 by first positioning the housing 34 into the gap 50 and transverse to the axis 54 of the passage, 52 and then rotating the housing 34 until it is aligned with the axis 54 of the passage 52. If desired, the guide arms 48 can be shaped and dimensioned such that the cable housing 34 snaps into engagement with the guide arms 48. While FIG. 8 illustrates the housing 34 straight, it should be understood that most housings (e.g., cable housings) are flexible, and thus the housing could be flexed at the location of the gap rather than reorienting the entire housing. Alternatively, the illustrated "hooks" could be closed loops, such that the housing would be threaded through the passage 52 along the axis 54.

The clamp member 44 is substantially v-shaped and is dimensioned to fit into the v-shaped gap 50 defined by the guide arms 48. The illustrated clamp member 44 includes a collar 60 and a fastener 62 threaded into the collar 60. The collar 60 includes a cylindrical opening 64 dimensioned to receive the cable housing 34, and a slot 66 that facilitates insertion of the cable housing 34 into the cylindrical opening 64. The clamp member 44 is made of a flexible and resilient material that will flex to allow the slot 66 to be opened for insertion of the cable housing 34 into the opening 64, and will snap back toward its original dimension to close the slot 66 and hold the collar 60 in engagement with the cable housing 34. The collar 60 further includes a threaded hole 70 in one side of the collar 60 that defines one side of the slot 66, and a through hole 72 in another side of the collar 60 that defines the opposing side of the slot 66. The through hole 72 is aligned with the threaded hole 70. It should be understood that the gap 50 and the clamp member 44 could have shapes other than the illustrated v-shape. Also, as used herein, a clamp member is anything that engages the housing and substantially inhibits relative axial movement.

The illustrated fastener 62 is a threaded bolt that is dimensioned to be inserted through the through hole 72 and into the threaded hole 70 of the collar 60. This arrangement allows the fastener 62 to be tightened to reduce the size of the slot 66 and thereby reduce the size of the cylindrical opening 64 of the collar 60. When a cable housing 34 is inserted in the collar 60, tightening of the fastener 62 will secure the collar 60 onto the exterior surface of the cable housing 34 and substantially prevent axial movement (i.e., along the axis 54) of the cable housing 34 relative to the collar 60. Because the collar 60 is wedged into the v-shaped gap 50 of the base member 42, this arrangement will also substantially prevent axial movement of the cable housing 34 relative to the base member 40 and relative to the down tube 24. It should be appreciated that, instead of a screw, the fastener could be any suitable device, such as a snap, clasp, adhesive, or other similar fastening means.

In operation, the cable housing 34 is secured to the housing guide 40 as follows. First, the cable housing 34 is positioned in the gap 50 of the base member 42 in an orientation transverse to the axis 54. The cable housing 34 is then rotated until it is seated within the guide arms 48 and substantially aligned with the axis 54 of the cylindrical passage 52. The clamp member 44 is then snapped onto the portion of the cable housing 34 positioned in the gap 50. The fastener 62 is then inserted through the through hole 72 and into the threaded hole 70 of the collar 60 and tightened until the collar 60 is secured to the cable housing 34. The result is that the cable housing 34 is fixed relative to the down tube 24 in both the axial direction (by virtue of the clamp member 44 squeezing the cable housing 34 and being positioned in the gap 50 between the guide arms 48) and the radial direction 56 (by virtue of the opposed, hook-shaped guide arms 48).

Various features and advantages of the invention are set forth in the following claims.

The invention claimed is:

1. A bicycle comprising:
    a frame;
    two wheels;
    handlebars;
    a longitudinal housing defining radial and axial directions; and
    a housing guide securing the housing to the frame, the housing guide including:
        a base member having a base surface secured to the frame and defining a passage in which the housing is positioned, the base member also having first and second guide arms spaced by a gap and at least partially wrapped around the housing; and
        a clamp member positioned in the gap between the guide arms and cooperating with the base member to secure the housing in both radial and axial directions.

2. A bicycle as claimed in claim 1, further comprising
    a cable-actuated device;
    a lever; and
    a cable positioned in and slidable relative to the housing, the cable being secured between the lever and the device and operable to transfer movement of the lever to the device.

3. A bicycle as claimed in claim 2, wherein the cable-actuated device comprises device selected from the group consisting of a brake and a shifter.

4. A bicycle as claimed in claim 1, further comprising
    a hydraulically-actuated device;
    a hydraulic lever; and
    hydraulic fluid positioned in the housing, the hydraulic fluid operable to transfer movement of the lever to the device.

5. A bicycle as claimed in claim 1, wherein the clamp member includes a collar and a fastener that tightens the collar onto the housing.

6. A bicycle as claimed in claim 5, wherein the collar comprises an opening and a slot that facilitates inserting the housing into the opening.

7. A bicycle frame comprising:
    a tube; and
    a housing guide secured to the tube, the housing guide including:
        a base member having a base surface secured to the tube and first and second guide arms spaced by a gap and cooperatively defining a passage in which a longitudinal housing can be positioned; and
        a clamp member positioned in the gap between the guide arms and cooperating with the base member to facilitate securing the housing in both radial and axial directions.

8. A bicycle frame as claimed in claim 7, wherein each guide arm comprises a hook.

9. A bicycle frame as claimed in claim 7, wherein the clamp member includes a collar and a fastener that tightens the collar.

10. A bicycle frame as claimed in claim 9, wherein the collar comprises an opening and a slot that facilitates inserting the housing into the opening.

11. A bicycle housing guide for securing a housing to a bicycle frame, the housing guide comprising:
    a base member having:
        a base surface adapted to be secured to a bicycle frame; and
        first and second guide arms spaced axially by a gap and cooperatively defining an axial passage in which a longitudinal housing can be positioned, wherein each guide arm comprises a hook; and
    a clamp member positioned in the gap and cooperating with the base member to facilitate securing the housing in both radial and axial directions.

12. A bicycle housing guide as claimed in claim 11, wherein the gap is substantially V-shaped, and the clamp member is similarly V-shaped to fit securely in the gap.

13. A bicycle housing guide as claimed in claim 11, wherein the clamp member includes a collar and a fastener that tightens the collar.

14. A bicycle housing guide as claimed in claim 13, wherein the collar comprises an opening and a slot that facilitates inserting the housing into the opening.

* * * * *